3,287,391
PREPARATION OF ALKOXY AND ARYLOXY
BOROXINES
Russell S. Towers, Adrian, Mich., assignor to Stauffer Chemical Company, Weston, Mich., a corporation of Delaware
No Drawing. Filed Apr. 6, 1964, Ser. No. 357,799
8 Claims. (Cl. 260—462)

This invention relates to a new and useful method for the preparation of hydrocarbonoxy boroxines, especially alkoxy boroxines, aryloxy boroxines and aryloxy alkoxy boroxines. More particularly, this invention relates to an improved method for preparing trimethoxy boroxine from which other boroxines can be prepared. However, the method is operative for the direct preparation of any hydrocarbonoxy boroxine.

Boroxines are well-known compounds and are generally regarded as 6-membered ring structures of alternate boron and oxygen atoms with organic groups on the three boron atoms. They have generally been prepared by the reaction of anhydrous boric oxide with a borate ester having the desired hydrocarbonoxy groups. For example, trimethoxy boroxine has been prepared by the digestion of anhydrous boric oxide with trimethyl borate. However, previous techniques have necessitated reaction times above ten hours in length. The method of this invention has reduced these reaction times to no more than approximately one hour.

The primary object of this invention is to provide a method for producing boroxines in high yield, using substantially shorter reaction times than was previously possible. Another object of this invention is to provide a method for the preparation of boroxines which can be readily adapted to commercial production facilities. These objects, as well as others which are obvious from the following description, are satisfied by this invention.

This invention comprises a method wherein boric oxide and a borate of the formula $B(OR)_3$ in which each R is a monovalent hydrocarbon radical containing no more than about six carbon atoms are reacted in contact with water present in an amount equal to from about 1.9 to about 3.5 percent by weight based on the weight of the boric oxide at a temperature ranging from about 125° C. up to the decomposition temperature of the borate, whereby the corresponding boroxine is produced. Preferably, the temperature should be at least 140° C. and in the case of the preparation of trimethoxy boroxine, the maximum practical temperature ranges up to about 200° C.

The boric oxide can be used in either of its two crystalline states and can be in the form of flakes, powder, granules or the like. It is preferably in fine powder form in order to provide a maximum amount of reaction surface for a given weight of boric oxide. A certain amount of water is generally inherent to boric oxide in either of its crystalline forms. Therefore, the boric oxide must be analyzed in order to have a proper control of the amount of water in the system. Usually, the water is added as a part of the boric oxide, but it can be added as free water.

The borates which are operable in the method of this invention have the general formula $B(OR)_3$ in which each R can be any monovalent hydrocarbon radical containing up to about six carbon atoms. More specifically, R can be an alkyl radical such as the methyl, ethyl, propyl, butyl or hexyl radical; a cycyloalkyl radical such as the cyclopropyl, cyclobutyl, cyclopentyl or cyclohexyl radical; an alkenyl radical such as the vinyl, allyl or hexenyl radical; a cycloalkenyl radical such as the cyclopentadienyl or cyclohexadienyl radical, or an aryl radical, i.e. the phenyl radical. The R groups in any borate can be different, but they are preferably alike and free of aliphatic unsaturation.

The temperature at which the desired reaction takes place is critical. The higher the temperature, the more rapid the reaction. However, the procedure in adding a borate to the boric oxide determines the maximum temperature which can be employed. One procedure involves the preparation of a slurry of boric oxide, water if necessary, and a fraction, for example, one-quarter, one-third or one-half of the stoichiometric amount of borate and heating the system to reflux temperature. The remainder of the borate is then added sufficiently slowly to maintain pot temperature at a maximum, but sufficiently fast to maintain reaction. The pot temperature gradually decreases due to the gradual reduction of reflux temperature of the system as borate is added. Alternatively, the boric oxide is suspended and heated in a reflux system to retain the water, and the borate is then brought in contact with the hot boric oxide, whereby an instantaneous reaction takes place and the boroxine product drains from the hot boric oxide bed.

This invention can be more easily understood from the following examples which are intended to illustrate rather than limit this invention, which is properly delineated in the claims.

EXAMPLE 1

One gram-mole portions of 20 mesh boric oxide containing the noted percentages by weight water were added with stirring to 0.5 gram-mole portions of methyl borate forming a heavy slurry. The systems were heated and refluxed until the pot temperatures reached the temperatures shown and refluxing had stopped. Another 0.5 gram-mole of methyl borate was added to each system as rapidly as possible while refluxing at 104° C. head temperature with the pot temperature finally going to 133–135° C. The product in each case was filtered and represented a nearly quantitative yield of trimethoxy boroxine.

Table I

| Run | Percent H₂O in B₂O₃ | Max. Pot Temp. ° C. | Reaction Time (min.) |
|---|---|---|---|
| A | 1.99 | 160 | 65 |
| B | 2.42 | 160 | 48 |
| C | 2.56 | 160 | 45 |
| D | 2.83 | 148 | 55 |

EXAMPLE 2

Each of the following alkyl borates was mixed with a 0.5 gram-mole portion 20 mesh boric oxide (containing 1.99% by weight water) in just sufficient amounts to form heavy slurries. In every case no more than 0.25 gram-mole of borate was needed. In some cases additional water was added as noted. The systems were heated to the maximum pot temperatures shown and sufficient additional borate was added to make the total borate used in each run equal to 0.5 gram-mole. The rate of addition in each run was governed by the reflux conditions. When the pot temperatures reached a steady minimum, the reactions were considered to be complete. In such case the appropriate boroxine was produced.

Table II

| Run | Borate | Add'l H$_2$O Added, gm. | Pot Temp. Range (° C.) | Reaction Time (min.) | Percent Conversion |
| --- | --- | --- | --- | --- | --- |
| E | n-Propyl | | 225–150 | 40 | 97 |
| F | n-Propyl | | 215–160 | 50 | 97 |
| G | n-Propyl | 0.13 | 225–150 | 30 | 97 |
| H | i-Propyl | 0.13 | 185–160 | 60 | *85 |
| J | i-Propyl | 0.45 | 200–150 | 60 | *99 |
| K | n-Butyl | 0.13 | 270–150 | 40 | *99 |

*Estimated.

The tri-n-propoxy boroxine had a refractive index $n_D^{20}=1.4111$. The tri-isopropoxy boroxine had a melting point of 52° C. The tri-n-butoxy boroxine had a refractive index $n_D^{20}=1.4197$.

EXAMPLE 3

When phenyl borate, cyclohexyl borate, allyl borate and cyclohexenyl borate are each substituted for the n-butyl borate in Run K of Example 2, essentially quantitative yields of triphenoxy boroxine, tricyclohexoxy boroxine, triallyloxy boroxine and tricyclohexenoxy boroxine respectively are obtained.

EXAMPLE 4

Sixty-three grams of boric oxide containing 1.99% by weight water was placed in a column similar to that shown in U.S. Patent 3,094,546 but supplied with an auxiliary heater; the boric oxide was heated to 190° C. 36.6 grams of methyl borate were placed in the pot, refluxed and allowed to drain back through the heated boric oxide, dropping the column temperature to 160–175° C.; the boric oxide and methyl borate reacted to produce trimethoxy boroxine. As the boroxine content increased, the pot temperature increased. When the pot temperature reached 150° C., the pot contents were found to be essentially trimethoxy boroxine. The total time elapsed was 48 minutes.

The boroxines prepared by the method of this invention are useful as fire extinguishers, welding fluxes, plasticizers, chemical intermediates and for other purposes such as forming synthetic resins with epoxides. The trimethoxy boroxine is especially valuable since the components necessary for its preparation are readily available and the product can be converted to other boroxines by such methods as those described in U.S. Patent 3,093,675.

Having thus described my invention, I claim:

1. The method comprising reacting boric oxide and a borate of the formula B(OR)$_3$ in which each R is a monovalent hydrocarbon radical containing up to about six carbon atoms in contact with water present in an amount equal to from about 1.9 to about 3.5 percent by weight based on the weight of the boric oxide at a temperature ranging from about 125° C. to the decomposition temperature of the borate, whereby the corresponding boroxine is produced.

2. The method of claim 1 wherein each R radical is free of aliphatic unsaturation.

3. The method comprising reacting boric oxide and an alkyl borate in which each of the alkyl groups contains up to about six carbon atoms in contact with water present in an amount equal to from about 1.9 to about 3.5 percent by weight based on the weight of the boric oxide at a temperature ranging from about 125° C. to the decomposition temperature of the borate, whereby the corresponding boroxine is produced.

4. The method comprising reacting boric oxide and methyl borate in contact with water present in an amount equal to from about 1.9 to about 3.5 percent by weight based on the weight of the boric oxide at a temperature ranging from about 125° C. to the decomposition temperature of methyl borate, whereby trimethoxy boroxine is produced.

5. The method of claim 4 wherein the temperature ranges from about 140° C. to about 200° C.

6. The method for preparing a boroxine comprising bringing a borate of the formula B(OR)$_3$ in which each R is a monovalent hydrocarbon radical containing up to about six carbon atoms into contact with boric oxide in an amount equal to at least two moles of boric oxide per mole of borate at a temperature ranging from about 125° C. to the decomposition temperature of the borate in the presence of water in an amount equal to from about 1.9 to 3.5 percent by weight based on the weight of the boric oxide and gradually bringing more borate in contact with said boric oxide up to a total of about one mol of borate per mol of boric oxide.

7. The method of claim 6 wherein each R radical is free of aliphatic unsaturation.

8. The method of claim 6 wherein the borate is methyl borate and the temperature ranges from about 135° C. to about 200° C.

References Cited by the Examiner

FOREIGN PATENTS 910,899  11/1962  Great Britain.

OTHER REFERENCES

Lappert: J. Chem. Soc. (London), 1958, pp. 2790–2793.

CHARLES B. PARKER, *Primary Examiner.*

D. R. PHILLIPS, *Examiner.*